(No Model.) 4 Sheets—Sheet 2.

W. S. HENSLEY & W. H. GRINDLEY.
PYROMETER.

No. 441,488. Patented Nov. 25, 1890.

Witnesses:
H. S. McArthur
S. L. Johnson

Inventors:
Wm H. Grindley
Wm S. Hensley
By Foster & Freeman
Attorneys.

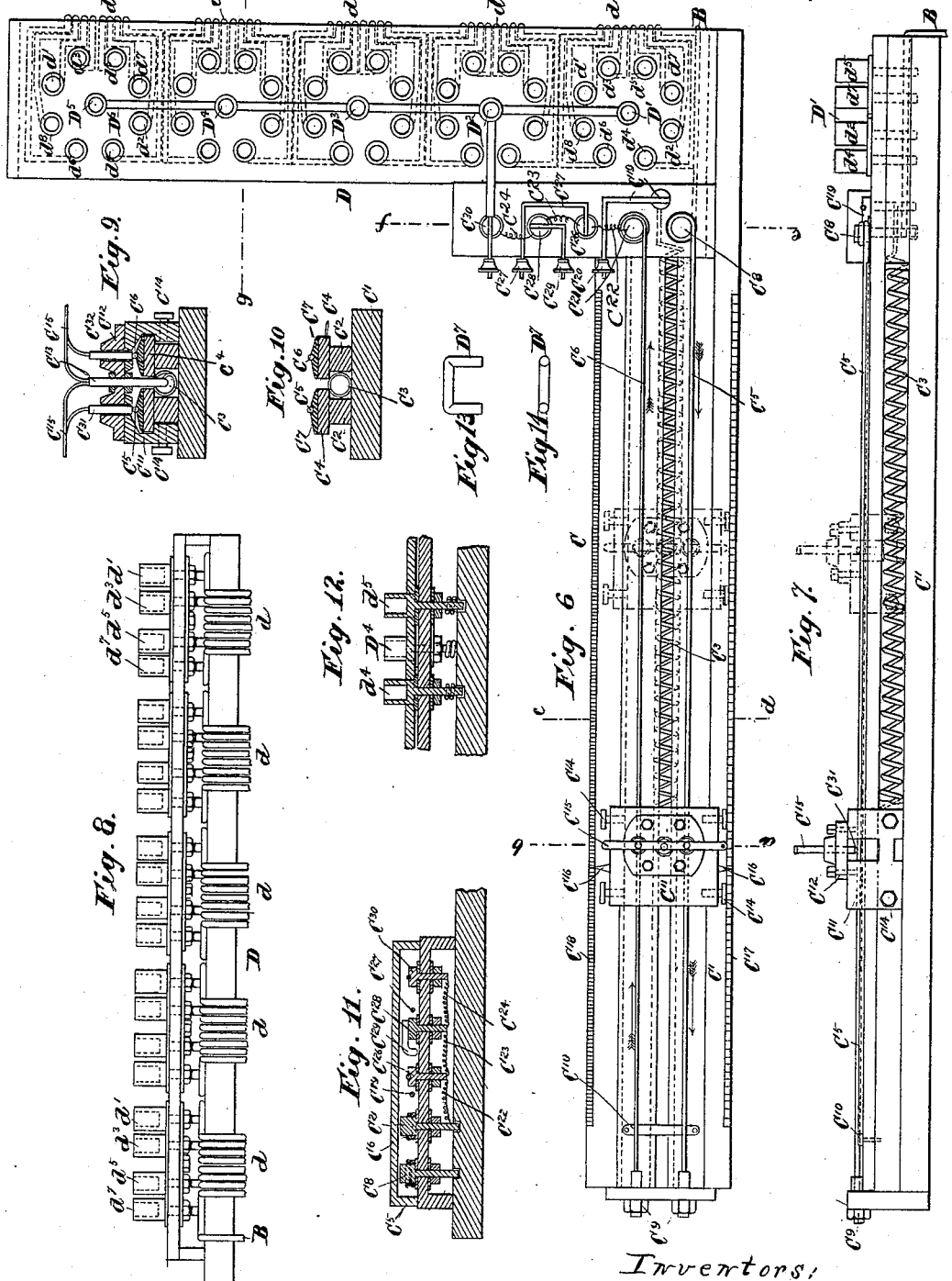

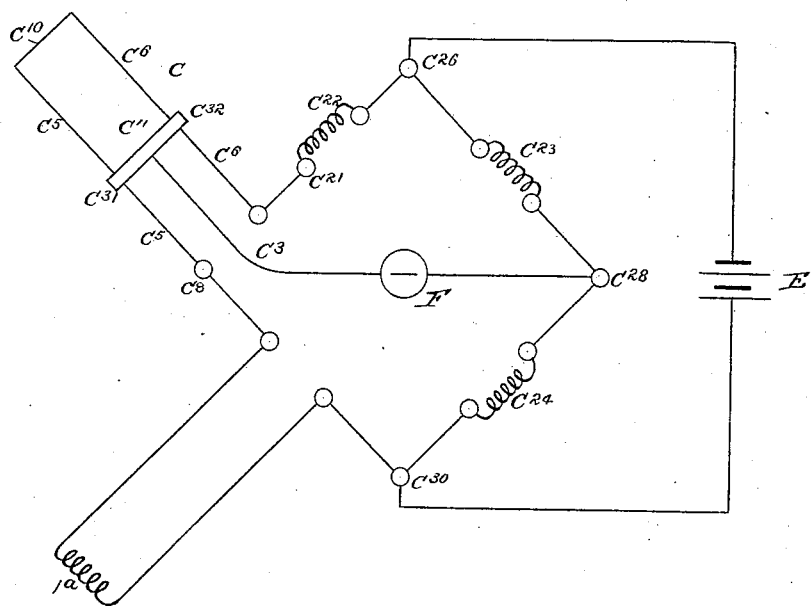

UNITED STATES PATENT OFFICE.

WILLIAM STONE HENSLEY, OF CARDIFF, AND WILLIAM HARRY GRINDLEY, OF TUNSTALL, ENGLAND.

PYROMETER.

SPECIFICATION forming part of Letters Patent No. 441,488, dated November 25, 1890.

Application filed April 22, 1889. Serial No. 308,096. (No model.) Patented in England September 8, 1888, No. 13,005.

*To all whom it may concern:*

Be it known that we, WILLIAM STONE HENSLEY, a subject of the Queen of England, residing at Cardiff, in the county of Glamorgan, and WILLIAM HARRY GRINDLEY, a subject of the Queen of England, residing at Tunstall, in the county of Stafford, both in England, have invented certain new and useful Improvements in or relating to Electrical Heat-Measuring Devices, (for which we have made application for Letters Patent in Great Britain, No. 13,005, dated September 8, 1888,) of which the following is a specification.

The object of this invention is to combine and arrange the under-mentioned apparatus in the following manner in order to measure the temperature or change of temperature of any form of oven-furnace or heated place. It embraces—

*a.* A coil or coils of platinum, of iridium wire, or of any other metal which would not melt or oxidize in the furnace-oven or other place in which the pyrometer might be used.

*b.* This coil of wire is wound on any material which is a sufficiently good insulator or at the temperature to be measured.

*c.* The coil is used as a resistance-coil, forming one of the arms or part of one of the arms of the instrument called a "Wheatstone bridge."

*d.* In this bridge a balance is obtained by means of a sliding contact. The position of this contact, which gives a balance, is determined by aid of any form of sensitive galvanometer.

*e.* The resistance of the coil of wire placed in the furnace-oven or other heated place varies with its temperature, and this variation of temperature is determined by the variation of the position of the sliding contact which gives a balance, this position being shown by the galvanometer.

Figure 1:
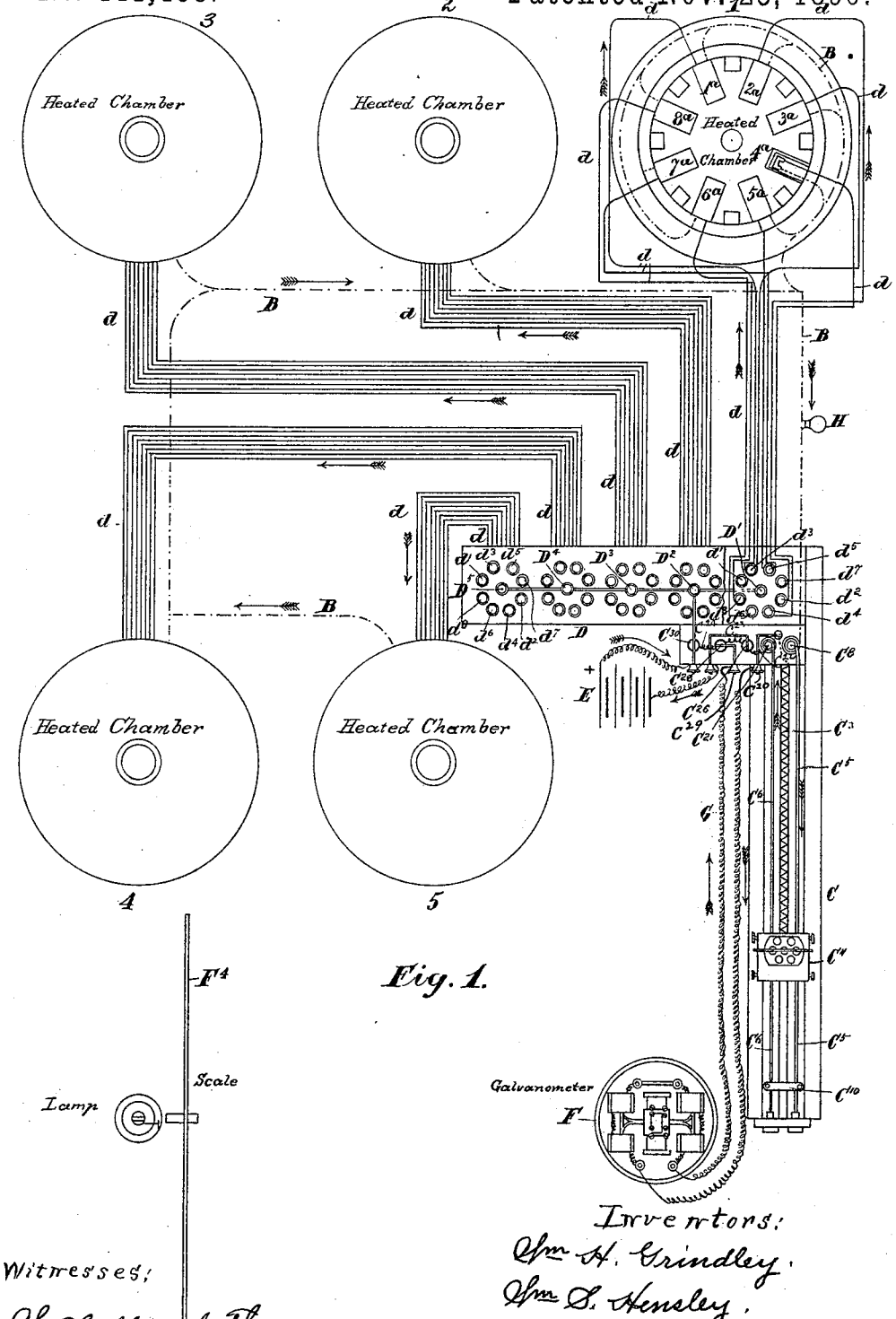

In the accompanying drawings, Figure 1 is a diagram illustrating the manner of working our invention in connection with five pottery-ovens hereinafter generically referred to as heated chambers, the number (five) being shown only by way of example. Figs. 2, 3, 4, and 5 are detail views of the arrangement of and preferred manner of constructing the coils located in such chambers. Figs. 6 and 7 are respectively a plan and an elevation of the combined Wheatstone bridge and switchboard, the latter of which is shown in elevation in Fig. 8. Figs. 9, 10, 11, and 12 are sections taken, respectively, on the lines $a\,b$, $c\,d$, $e\,f$, and $g\,h$ of Fig. 6. Figs. 13 and 14 being views of the contact-piece or switch used in connection with the switch-board. Fig. 15 is a diagrammatic view illustrating in a simplified manner the circuits in the Wheatstone bridge.

Figure 2:
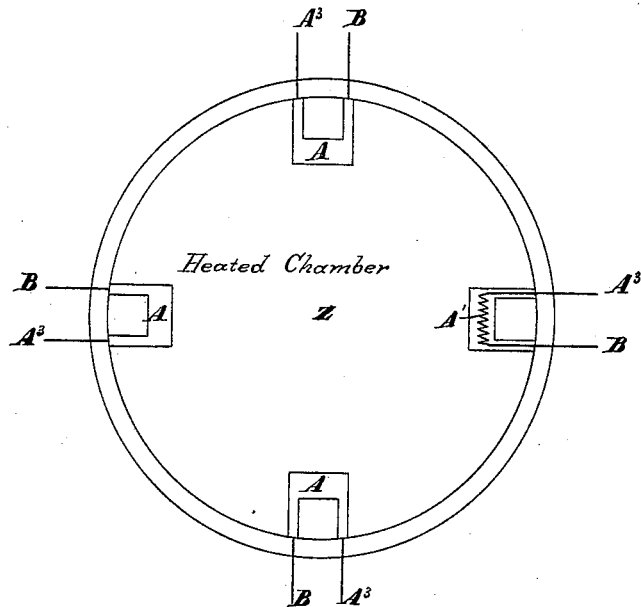
Figures 1, 3:
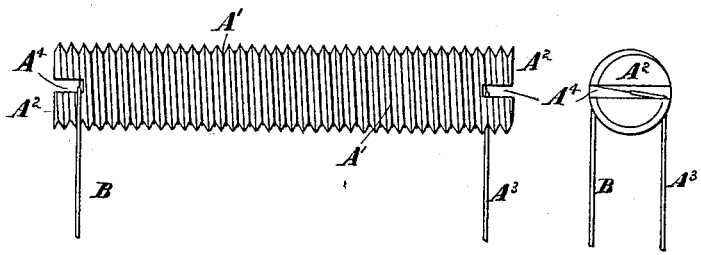
Figure 5:
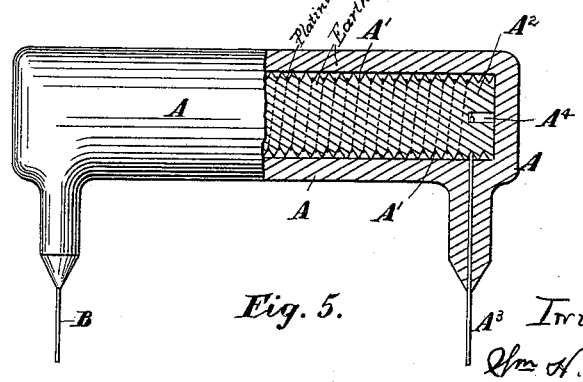

The resistance devices A, Fig. 2, by the changes of temperature and consequently of electrical resistance whereof will be determined the variations in the temperature to which they are exposed, are each preferably constructed in the manner shown in Figs. 3, 4, and 5, Figs. 3 and 4 representing the said coil in a preparatory stage, and Fig. 5 being a view partly in elevation and partly in section of one of the said coils completed.

$A'$ is the coil proper, which is composed of, preferably, platinum or iridium wire.

$A^2$ is a core of, preferably, baked earthenware, upon which is formed a screw-thread and in its ends transverse recesses $A^4$. The coil $A'$ is wound around the core $A^2$ in the groove between the screw-thread upon it, and the ends of the coil are united to the two (preferably) platinum leads $A^3$ and B, which, as shown in Fig. 2, will afterward be passed through the wall of the chamber Z, whose temperature or changes of temperature it is desired to ascertain, these leads themselves being connected to the copper leads by which the coils $A'$ are connected to the apparatus hereinafter described. The two joints between the coil $A'$ and leads $A^3$ and B are each located in one of the recesses $A^4$. The coil $A'$, core $A^2$, and adjacent part of the lead wires $A^3$ and B, to preserve them from the injurious effects of the gases, are then entirely surrounded with plastic clay or equivalent material in the manner shown in Fig. 5, and the whole is then baked in an oven or the like until the covering A has become quite hard.

On referring to Fig. 5 it will be seen that the covering A is so placed around the core $A^2$ and coil $A'$ (resting, as it does, on the top of the screw-thread) as to leave the said coil free to expand and contract, while at the same time preventing any risk of short-circuiting by any two of the turns coming into contact.

In each of the five heated chambers represented in Fig. 1 there are arranged any suitable number—say, for example, eight—of the before-described coils, as shown in one such chamber, where they are marked $1^a$, $2^a$, $3^a$, $4^a$, $5^a$, $6^a$, $7^a$, and $8^a$, four of these coils—say those referred to by the odd numbers—being near the floor and the other four near the roof or other required position.

Through the lead wire B, which in Fig. 1 is represented in a dot-and-dash line, one terminal of each of the before-described coils A' is connected, so as to form part of one arm of the Wheatstone bridge C, its other terminal being directly connected to the switch-board D and indirectly through it and the battery E and galvanometer F to one of the other arms of the said bridge. This bridge, which under our invention is of an improved construction, as shown in Figs. 6, 7, 9, 10, and 11, is formed with a wooden or other base C' and two longitudinal ribs $C^2$, which form a channel between them, as shown clearly in Figs. 9 and 10, for receiving the elastic conductor $C^3$. $C^4$ are strips secured one on the top of each of the ribs $C^2$, and upon which the preferably German-silver or platinoid wire $C^5$ or $C^6$ is bedded in insulating material $C^7$. The employment of the two wires $C^5$ and $C^6$ is a convenient form of applying a complete bridge-wire the resistance of which per unit length is different in different parts, and for this purpose the wire $C^6$ is preferably made thinner than the wire $C^5$. These wires are made fast at one end to metal connecting-studs $C^8$ and $C^{21}$, and each is drawn tight by means of a nut $C^9$ at its other end, the said two wires being electrically connected together by the metal strip $C^{10}$, of such low resistance as to be inappreciable. The reason we use, as $C^5$, a thicker wire, and in consequence a wire of less resistance than that marked $C^6$, is that the instrument may be more sensitive for those temperatures for the ascertaining of which the said wire $C^5$ will be in use—viz., the high temperatures, say, above 1,400° Fahrenheit—which of course it is absolutely necessary, for certain purposes, shall be reliably determined. In other words, the higher temperatures for which the instrument is especially designed will be indicated by the scale $C^{17}$, adjacent to the wire $c^5$, and by having said wire thicker and of less resistance than the other the units of the adjacent scale will be longer, the index can be more easily and accurately adjusted, and the result more easily read. The same result might be obtained by making both wires $C^5 C^6$ of the larger size; but this would necessitate adding greatly to their length to obtain the required total resistance and involve a more costly and cumbrous apparatus.

$C^{11}$ is a carriage which is capable of sliding on the stationary part C' $C^2$ $C^4$, hereinafter generally referred to as the bed C'. The upper part $C^{12}$ of this carriage is preferably of metal, and is provided with a fixed post $C^{13}$, which is electrically connected to the elastic conductor $C^3$. The lower part of the said carriage may be of metal, wood, or any other suitable material and is provided with clamping-screws $C^{14}$. The part $C^{12}$ carries the metal studs $C^{31}$ $C^{32}$, the lower ends of which, as shown in Fig. 9, are preferably tipped with platinum or other not readily oxidizable metal, the upper ends being electrically connected through the flexible spring-conductors $C^{15}$ to the post $C^{13}$, and consequently to the conductor $C^3$. The studs $C^{31}$ and $C^{32}$ are normally not in contact with the wires beneath them, being held in their raised position by the spring-conductors $C^{15}$ until they are pressed down by hand, so as to be brought into electrical contact with the wires $C^5$ and $C^6$, respectively, beneath each.

The carriage $C^{11}$ carries two pointers $C^{16}$ for indicating by the relative position of one or other of them on the scale $C^{17}$ or $C^{18}$ the temperature it is desired to ascertain. The end of the elastic conductor $C^3$ opposite to that connected to the post $C^{13}$ is electrically connected through the stud and wire $C^{19}$ with the binding-screw $C^{20}$, by means of which, as shown in Fig. 1, it is electrically connected with the galvanometer F, which is of any desired construction. The conductor $C^3$ is preferably in a coiled form, so as to provide the elasticity which is necessary to allow the carriage $C^{11}$ to be moved along the bed C', while always maintaining electrical connection between the post $C^{13}$ and stud $C^{19}$.

To the stud $C^{21}$, to which is attached the wire $C^6$, as shown most clearly in Fig. 11, is electrically connected the resistance-coil $C^{22}$, which, as are also the resistance-coils $C^{23}$ and $C^{24}$, is connected in series therewith, these in the drawings merely being shown diagrammatically. The resistances of the coils $C^{23}$ and $C^{24}$ must be equal, and each should be about equal to that arm of the bridge which contains one of the oven-coils when the said oven-coil is at that temperature for which maximum sensitiveness is required and when the bridge is balanced. The resistance of the whole bridge-wire $C^6$ and $C^5$ must be equal to half the difference between the resistance of one of the oven-coils when at the maximum temperature which the pyrometer is intended to register and the resistance of the said oven-coil when at the minimum temperature which this pyrometer is intended to measure. The resistance of the coil $C^{22}$ must be equal to that of the arm of the bridge which contains one of the oven-coils when the said oven-coil is at its minimum temperature and when the bridge is balanced.

The stud $C^{26}$, by which the coils $C^{22}$ and $C^{23}$ are united, is electrically connected through the wire and binding-screw $C^{27}$ with one—say the negative—pole of the battery E, as shown in Fig. 1, this battery being preferably formed of one or more Daniell cells, of total resistance lower than that of the galvanometer employed, and the stud $C^{28}$, by which the coils $C^{23}$ and $C^{24}$ are joined, is connected by the wire and binding-screw $C^{29}$ to one terminal of the galvanometer F, the other terminal of which, as hereinbefore described, is connected to the elastic conductor $C^3$ through the binding-screw $C^{20}$. The end of the coil $C^{24}$ opposite to that herein described as connected to the post $C^{28}$ is connected through the stud $C^{30}$ to the other or, say, positive pole of the battery E, and by the metallic conductors $D^6$ to the mercury-containing cups $D'$, $D^2$, $D^3$, $D^4$, and $D^5$, which respectively correspond with the heated chambers marked 1, 2, 3, 4, and 5—that is to say, through the group of mercury-cups, the center one of which is marked $D'$, the temperature of the chamber 1 will be determined, and similarly with the group marked $D^2$ will the temperature of the chamber 2 be determined, and so on throughout the series. The mercury-cups $d'$, $d^2$, $d^3$, $d^4$, $d^5$, $d^6$, $d^7$, and $d^8$ of each group are each electrically connected by a separate lead $d$ to one end of one of the coils within one of the chambers marked from 1 to 5, the opposite end of such coil being, as hereinbefore described, connected through the lead B with one arm of the Wheatstone bridge C. Now, as there are eight different coils located at various parts of each of the heated chambers, corresponding with the eight mercury-cups marked from $d'$ to $d^8$, by making contact between any one of the said cups and the center cup of its group the circuit will be completed and the current will flow through the particular coil corresponding to that particular cup. The means by which we electrically connect any of one group of the cups $d'$ to $d^8$ with the cup at the center of its group consists of the bridge piece or switch $D^7$, Figs. 13 and 14, the legs of which are at such a distance apart that they will enter the two said cups.

The galvanometer which we prefer to employ in conjunction with the before-described apparatus is of the class known as "reflecting-galvanometers," and is preferably very sensitive in its action, its resistance being slightly lower than that of the whole oven-circuit when at its maximum temperature, and $F^4$, Fig. 1, is the scale upon which it is arranged to reflect a ray of light.

Suppose now, with the various parts connected together as before described, it is desired to ascertain the temperature at the part of the heated chamber 1 where the coil $1^a$ is situated. First the switch $D^7$ is placed so that its legs dip one into the cup $D'$ and the other into the cup $d'$. Then with the carriage $C^{11}$ placed at any point of the bed $C'$ one of the studs $C^{31}$ or $C^{32}$ is pressed onto the wire below it. The connections of the Wheatstone bridge are thus completed, the four arms being as follows, viz: first, from the post $C^{30}$ through the connections $D^6$ to the cup $D'$, then through the switch $D^7$ to the cup $d'$, and then through the wire $d$ to the coil $1^a$, and through this coil and the wire B to the post $C^8$, and then through the bridge-wire to the point of contact of the stud $C^{31}$ or $C^{32}$ pressed down on it, as mentioned; second, from the last-mentioned point of contact on the bridge-wire through the remainder of the latter to the post $C^{21}$, and then through the coil $C^{22}$ to the post $C^{26}$; third, from the post $C^{26}$ through the coil $C^{23}$ to the post $C^{28}$; fourth, from the post $C^{28}$ through the coil $C^{24}$ to the post $C^{30}$; also the galvanometer-circuit extends from the point of contact of the stud $C^{31}$ or $C^{32}$ pressed down on the bridge-wire through the conductor $C^3$ to the binding-screw $C^{20}$, and thence through the galvanometer and the binding-screw $C^{29}$ to the post $C^{28}$; also the battery-circuit extends from the post $C^{26}$ through the binding-screw $C^{27}$ and the battery to the binding-screw and post $C^{30}$. Under these circumstances the current coming from the positive pole of the battery E will be divided between the above-mentioned several circuits making up the Wheatstone bridge, the proportion of the current flowing through each circuit depending on the several resistances of each of the six circuits. Further, the direction of the current through the galvanometer, and therefore the direction of deflection of the spot of light on the galvanometer-scale $F^4$ when the stud $C^{31}$ or $C^{32}$ is pressed down, will depend only on the relative resistances of the four circuits above described as constituting the arms of the bridge. Further, if a certain well-known relation exists between the resistance of the arms, the strength of the current in the galvanometer will be zero, and therefore the deflection of the spot of light on the scale $F^4$ when the stud $C^{31}$ or $C^{32}$ is pressed down will be zero, and if, as described, the coils $C^{23}$ and $C^{24}$ are equal this will be the case when the arm containing the coil $1^a$ is equal in resistance to that containing $C^{22}$.

If the bridge-wire is made of the resistance stated above, and if the temperature of the coil $1^a$ is between the greatest and least registered by the pyrometer, then a point must exist on the wire such that if the contact due to pressing down the stud $C^{31}$ or $C^{32}$ is made at this point the last-mentioned relation between the resistances of the arms will be satisfied. If, then, the stud is pressed down at this point there will be no current in the galvanometer, and consequently no deflection of the spot of light on the scale $F^4$; and since the connecting-piece $C^{10}$ is of such low resistance as to be negligible, it is possible by sliding the carriage $C^{11}$ by hand along the bed $C'$ to make contact with one or other of the studs $C^{31}$ or $C^{32}$ at any point whatever in the length of the wire. Contact is then made at various points of the wire until by trial a point is found at which on pressing down one or other of the studs $C^{31}$ or $C^{32}$ there is no deflection of the spot of light on the scale $F^4$. The temperature on the arbitrary scale of the instrument is then read off at once by the position of the pointer $C^{16}$ on the scale $C^{18}$ if the above-mentioned point of contact on the wire is found to be obtained by pressing down $C^{32}$, or by the position of the pointer $C^{16}$ on the scale $C^{17}$ if it is obtained by pressing down $C^{31}$.

The trials necessary to obtain the required point of contact on the wire such that no deflection of the spot of light on the scale $F^4$ is produced by pressing down the stud are greatly expedited by observing that if the point of contact has been moved too far along the wire measured from either end the deflection of the spot of light on making contact will be in one direction along the scale $F^4$, whereas if the point of contact has not been moved far enough along the wire the deflection of the spot of light will be in the other direction along $F^4$. In a similar manner if it be desired to ascertain the temperature of a particular part of another chamber— say, for example, the chamber 3, Fig. 1—then the switch $D^7$ is placed so that one leg dips into the cup $D^3$ and its other leg into that cup which is connected by one of the wires $d$ with the coil located at the particular part desired.

In order to nullify the effects which the variations in the external temperature would have upon the resistance of the copper leads connecting the coils A in the heated chambers with the bridge C and switch-board D, we employ carbon, as the resistance of that substance falls as the temperature rises, which is the reverse property of copper, of which the leads B and $d$ are preferably formed, the resistance of these rising with the temperature. A suitable manner of applying this property of carbon to our invention consists in inserting in the lead B an incandescent lamp, as shown in Fig. 1, where the said lamp is marked H, the said lamp or its equivalent being of a resistance about eight times that of the copper leads exposed to the external temperature, it being understood that the exposed leads $d$ for each heated chamber should all be of the same resistance. If, however, the resistances of the leads $d$ are not equal, then it will be necessary to introduce separate incandescent lamps, such as H, in each of the leads $d$ or in some of them if all are not unequal, or to introduce further lamps into the lead B, these further lamps being placed in parts of the wire B farther from the key-board than the point at which this wire is divided between the ovens. In any such case the resistances of the various lamps used must be such that the total resistance of carbon in any oven-circuit is about eight times the resistance of the copper wire exposed to the external temperature in that circuit.

In some heated chambers it is not so much necessary that the actual temperature should be known as that there can be insured a uniform rise of temperature throughout the firing and that the greatest heat of the chamber should not rise above a certain maximum nor fall below a certain minimum, and these maximum and minimum points may conveniently be indicated on one or both of the scales $C^{17}$ $C^{18}$, Fig. 6, by red lines.

Having now particularly described and ascertained the nature of our said invention and in what manner the same is to be performed, we declare that what we claim is—

1. In an electric heat-measuring device, a resistance device consisting of an earthenware core upon which is wound a coil of wire and a covering of earthenware or like fire-resisting material through which the terminals or leads of the wire coil pass, in combination with a Wheatstone bridge, with which the terminals of the said coil are connected, substantially as described.

2. In an electric heat-measuring device, a resistance device consisting of a threaded earthenware core, a coil of wire laid around the core in the groove formed by the thread thereon, and a covering of earthenware or like fire-resisting material surrounding the said core and resting upon the threads thereof, and through which the terminals or leads of the wire coil pass, in combination with a Wheatstone bridge, with which the said terminals of the coil are connected, substantially as set forth.

3. In an electric heat-measuring apparatus, the combination, with a switch-board and the resistance devices in the chambers where the heat is to be tested or measured, of a Wheatstone bridge having two wires connected with each other and with the said switch-board, and its movable carriage provided with two contact devices adapted to be brought into contact with one or the other of the said wires, substantially as set forth.

4. In an electric heat-measuring apparatus, the combination, with the resistance device in the chamber whose heat is to be tested or measured and the electric connections therewith, of a Wheatstone bridge having portions of its bridge-wire of different resistances per unit length, substantially as set forth.

5. A Wheatstone bridge consisting of the resistance-coils, such as $C^{22}$, $C^{23}$, and $C^{24}$, an elastic conductor, such as $C^3$, wires $C^5$ and $C^6$, connections $C^{10}$, and adjustable carriage, such as $C^{11}$, carrying posts or studs, such as $C^{13}$, $C^{31}$, and $C^{32}$, electrically connected together, the whole constructed and operating substantially as and for the purpose herein described, and illustrated in the accompanying drawings.

6. A Wheatstone bridge constructed with two or more wires, such as $C^5$ and $C^6$, which are equivalent to one single wire having different resistances per unit length in different parts, substantially as and for the purpose herein described, and illustrated in the accompanying drawings.

7. The complete heat-measuring apparatus consisting of the combination of heat-resisting coils, leads, Wheatstone bridge having wires of different resistances, switch-board, galvanometer, resistance-coils, and battery, substantially as herein described.

In testimony whereof we have hereunto set our hands in the presence of the two subscribing witnesses.

WILLIAM STONE HENSLEY.
WILLIAM HARRY GRINDLEY.

Witnesses:
F. ARNOLD,
L. B. CARSLAKE.